United States Patent [19]

Hollandsworth et al.

[11] 4,239,389
[45] Dec. 16, 1980

[54] VEHICLE WHEEL AND BODY ALIGNMENT DIAGNOSING SYSTEM

[75] Inventors: William J. Hollandsworth, Town and Country; Dean O. Grubbs, Manchester, both of Mo.

[73] Assignee: Hunter Engineering Company, Bridgeton, Mo.

[21] Appl. No.: 967,072

[22] Filed: Dec. 6, 1978

[51] Int. Cl.³ ............................................. G01B 11/26
[52] U.S. Cl. ...................... 356/155; 33/288; 356/152
[58] Field of Search ............................. 356/152, 155; 33/203.18, 288

[56] References Cited

U.S. PATENT DOCUMENTS

| | | | |
|---|---|---|---|
| 2,601,262 | 6/1952 | Carrigan | 356/155 |
| 4,095,902 | 6/1978 | Florer et al. | 356/155 |
| 4,097,157 | 6/1978 | Lill | 356/155 |
| 4,126,943 | 11/1978 | Senften | 33/228 |

Primary Examiner—Richard A. Rosenberger
Attorney, Agent, or Firm—Gravely, Lieder & Woodruff

[57] ABSTRACT

A system for diagnosing the alignment characteristics of the wheels on a vehicle so that the planes of rotation of the wheels may be determined in relation to each other and with respect to the effect the wheels have on the attitude of the vehicle body while in motion. The system is made up of several instruments which develop signals which can be processed through electronic computation means capable of performing the necessary processing steps rapidly, with a high degree of accuracy and to a state in which the information can be displayed as soon as it is developed, stored for subsequent use, or transposed into a print-out.

20 Claims, 9 Drawing Figures

VEHICLE WHEEL AND BODY ALIGNMENT DIAGNOSING SYSTEM

BACKGROUND OF THE INVENTION

The ideal geometric configuration of a four wheel vehicle is a rectangle in which: the steerable wheels will run parallel with each other and are equidistant from the center of the connecting axle or its equivalent; in which the nonsteerable wheels will run parallel with each other and are equidistant from the center of the connecting axle or its equivalent; in which the non-steerable wheels either track with the steerable wheels or are equally off set from the steerable wheel tracks; and in which the vehicle body has its longitudinal geometric center line coincident with the longitudinal center line for the steerable and non-steerable wheels.

The practical and economic considerations involved in the production of wheeled vehicles take into account the complications in connection with manufacturing tolerances present in the various parts and the possibility that tolerance mis-matching can build up variations from the ideal geometric configuration. As a consequence of the possible mis-matching of tolerances in the parts making up a finished vehicle provision is made for mechanically adjusting wheel positions relative to the chassis or body of a vehicle. In some vehicles all adjustments are found in the steerable wheel assemblies, while in others the adjustments are provided in both the steerable and non-steerable wheel assemblies. Generally vehicles are permitted to have some deviations from the ideal conditions of wheel alignment and wheel to body alignment. As long as the deviations are not regarded as serious the vehicle is put into use.

In the vast majority of cases vehicles are sold with the alignment characteristics well within specification tolerance, and the alignment provides satisfactory results for the owners. Nevertheless, after a period of use the mechanism mounting the wheels on the chassis or body wear, and the alignment characteristics deviate from normal tolerance. Of course, under such conditions the provisions made for adjusting wheel alignment are used to restore the alignment to the desired conditions. A well treated vehicle can have its alignment diagnosed and adjusted to specifications, but one that has been mistreated or has been involved in a collision is much more difficult to diagnose or correct.

The many conditions attached to the original assembly of vehicles, and the equally many things that can occur to change wheel alignment on vehicles in use, make the design of apparatus to diagnose those conditions and changes very difficult. In the past apparatus has been provided that is capable of limited wheel alignment diagnosing ability. Some apparatus is simple to operate and some is very difficult and complicated, but in either type of apparatus there is little or no provision for obtaining a complete understanding of the interrelations of the steerable to non-steerable wheels, or of the relationship between wheels and vehicle body, or of the part that center point steering wheel position plays in relation to the other characteristics.

Examples of apparatus devised for examining vehicle wheel alignment characteristics include Carrigan U.S. Pat. No. 2,601,262, issued June 24, 1952, which is a light beam projection system incorporating passive light reflective mirrors on the steerable and non-steerable wheels and a chart spaced away from the vehicle to be in alignment with the light beam. Wheel alignment testing equipment involving placing it against machined surfaces on the wheels is shown in Holub U.S. Pat. No. 2,972,189 issued Feb. 21, 1961. This equipment is directed to the capability of locating and measuring misalignment in the frame and front and rear housings of a vehicle, as well as checking wheel tracking, all with line of sight telescopes and mechanical components. A somewhat similar vehicle wheel alignment device has been disclosed in MacMillan U.S. Pat. No. 3,091,862 issued June 4, 1963, but this is limited to use of sighting tubes and portable targets.

More sophisticated apparatus for indicating wheel alignment characteristics has been shown in Manlove U.S. Pat. No. 3,164,910 issued Jan. 12, 1965 and No. 3,181,248 issued May 4, 1965 respectively. In these arrangements mechanical pointers are caused to move over scales for checking alignment characteristics. The use of light beam projecting means for wheel alignment checking is disclosed by Holub U.S. Pat. No. 3,337,961 issued Aug. 27, 1967. However, the projectors illuminate scales at different times and so avoid simultaneous operation. Another system for using light beams in association with steerable wheels has been disclosed by Senften U.S. Pat. No. 3,782,831 issued Jan. 1, 1974 in apparatus for determining the angular position between a fixed and a movable body, such as the position of the steerable wheels relative to the axle. Electronic scanning devices butted against the vehicle steerable and non-steerable wheels has been disclosed by Hirmann U.S. Pat. No. 3,855,709 issued Dec. 24, 1974 wherein the scanning devices measure chassis geometry from the wheel position.

Alignment equipment limited to front wheel toe is shown in Butler U.S. Pat. No. 3,865,492, issued Feb. 11, 1975. This type of equipment has severe limitation as to what information can be obtained about the alignment characteristics of vehicle wheels and body. The prior art includes the electronic run-out compensation means of Senften U.S. Pat. No. 3,892,042 issued July 1, 1975 which is concerned with getting wheel alignment checking means properly oriented with the plane of wheel rotation. More recently, electronic alignment apparatus for indicating front wheel toe has been disclosed by Rishoud, et al U.S. Pat. No. 3,963,352 issued June 15, 1976, or by Florer, et al in U.S. Pat. No. 4,095,902 issued June 20, 1978, or by Lill in U.S. Pat. No. 4,097,157 issued June 27, 1978.

The most recent apparatus is shown in Hunter patent application, Ser. No. 942,302, filed Sept. 14, 1978, wherein apparatus is provided which has the ability to diagnose alignment characteristics.

BRIEF DESCRIPTION OF THE INVENTION

This invention is related to the apparatus shown in copending patent application of Hunter, Ser. No. 942,302 filed Sept. 14, 1978 and directed to vehicle wheel alignment apparatus, and is more specifically directed to vehicle wheel and body alignment diagnostic facilities and the circuitry associated therewith in a novel system.

An important object of the present invention is to provide a unique system of instruments for diagnosing vehicle wheel alignment characteristics so that the performance of the vehicle can be checked and improved when found necessary.

Another object of this invention is to provide a system for correlating the functions of different types of sensors so the planes of wheel rotation individually and in sets may be determined and displayed for analysis and correction.

Yet another object of this invention is to provide a system of instruments capable of measuring alignment characteristics of vehicle wheels in respect of the effect they may have on the motion of the vehicle and the alignment attitude of the vehicle body relative to the direction of motion, as well as showing a need for modifications in the position of the wheels.

Other objects of the present invention are to provide a system for determining the alignment characteristics of vehicle wheels using an organization of active and passive sensors related to the wheels, to provide a system for finding the alignment characteristics of steerable as well as non-steerable wheels, and to provide a system for accomplishing the foregoing so that vehicle motion can be improved.

Further objects of the present invention are to simplify the construction of the essential apparatus, to increase the accuracy of results in the use of the apparatus, to devise apparatus that may be used with a variety of wheel mounting arrangements, and to be able to check out the critical wheel alignment parameters quickly, accurately and with instruments having unique characteristics.

BRIEF DESCRIPTION OF THE DRAWINGS

The various components making up the apparatus of the present invention have been disclosed in the accompanying drawings, wherein.

DETAILED DESCRIPTION OF THE INVENTION MECHANICAL APPARATUS

Figure 1:
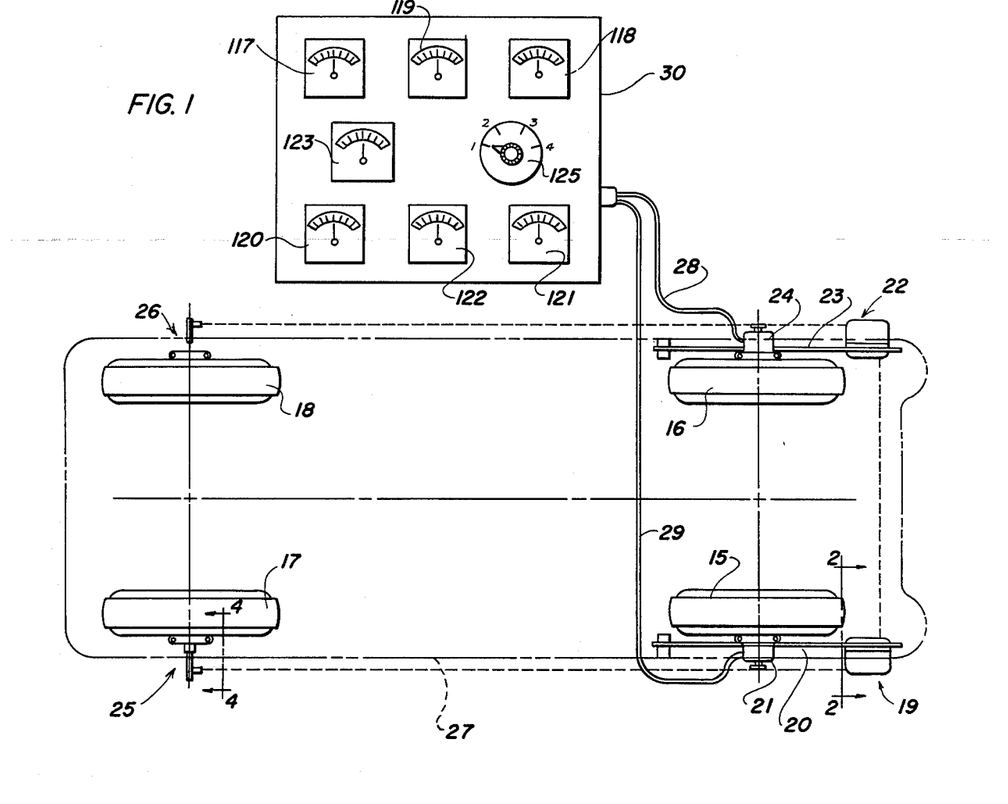
FIG. 1 is a general plan view of the wheel layout of a vehicle and an outline of the body therefor, together with the major components of apparatus for diagnosing alignment characteristics of the steerable and non-steerable wheel sets and wheel to body relationship.

A presently preferred vehicle wheel alignment diagnosing apparatus is seen in FIG. 1 in association with a vehicle having a right steerable front wheel 15, a left steerable front wheel 16, a right non-steerable rear wheel 17, and a left non-steerable rear wheel 18. The instrumentation for the present apparatus includes a sensor unit 19 carried on a support arm 20 which is part of a mounting device 21 attached to the wheel 15, and a similar sensor unit 22 carried on a support arm 23 which is part of a mounting device 24 attached to the wheel 16. Each device 21 and 24 embodies run-out compensation means of a type disclosed in Senften U.S. Pat. No. 3,891,042 granted July 1, 1975. The purpose of the run-out compensation means is to position the sensor units 19 and 22 in a predetermined relationship with the plane of rotation of the front wheels 15 and 16 respectively. Furthermore, each sensor unit embodies a photosensor in position to be energized when scanned by a light beam. The photosensor will be described presently.

The sensor units 19 and 22 have certain photosensors activated by the transversely directed beams coming from the opposite beam, and other photosensors activated in a predetermined manner by passive alignment means carried by thrust line units mounted on the rear or non-steerable wheels. These passive means and thrust line units are seen in FIG. 1 at 25 on the right rear wheel 17 and at 26 on the left rear wheel 18. The thrust line units 25 and 26 are identical except for being made in right hand and left hand form, each includes a flat mirror and a retro-reflector for returning light beams projected longitudinally of the vehicle, represented by the body outline 27, and returned to the sensor units 19 and 22 on the front wheels being tracked or followed by the rear wheels. Each thrust line unit 25 and 26 is constructed so the center area of the mirror, as well as the position of the retro-reflector, is substantially the same distance out from the plane of rotation of the wheel on which they are supported.

The sensor units 19 and 22 project light beams transversely of the vehicle body 27 toward the opposite sensor unit as well as toward passive reflectors at the rear wheels. Signals generated at the photosensors in the sensor units 19 and 22 are individually transmitted by bundle wire leads 28 and 29 to a console 30 where they are processed and displayed. The console 30 may be stationary or it may be mobile so that the signal display can be better seen while adjustments are being performed on the vehicle wheels. The details of the sensor unit 19 carried by the steerable right front wheel 15 will also apply to the sensor unit 22 on the steerable left front wheel 16.

Figure 2:
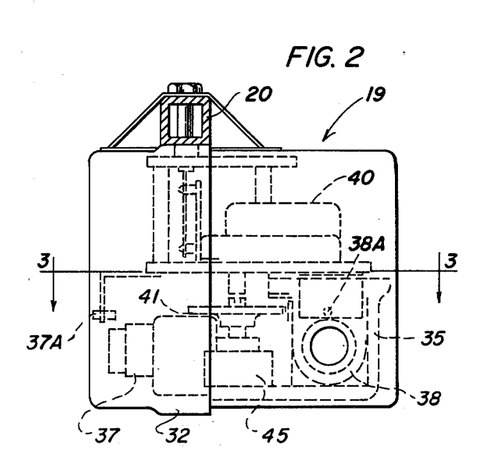
FIG. 2 is an elevational view of a typical sensor unit carried on a steerable wheel, the view being taken along line 2—2 in FIG. 1.
Figure 3:
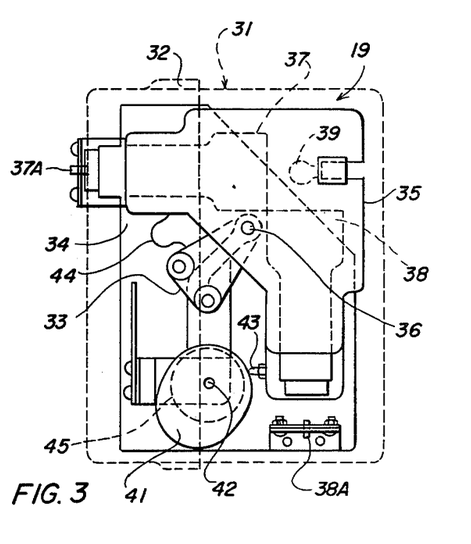
FIG. 3 is a transverse view of the sensor unit of FIG. 2 as seen along line 3—3.

FIGS. 2 and 3 show the typical sensor assembled in a suitable housing 31 which is made up of two parts engaged at a slip joint 32. The unit includes a fixed bracket 33 attached to a plate 34. A cast body 35 is pivoted on the bracket 33 at pivot element 36 so the body can swing back and forth in a horizontal plane. The body 35 carries a light beam projector 37 and a second projector 38 at substantially 90° to the first projector so that a single source of light 39 will be projected at the same time by each projector 37 and 38. A motor 40 drives a cam 41 mounted on shaft 42, and the body 35 is provided with a cam follower 43 which is held on the cam surface by a spring 44. The cam 41 is contoured to effect oscillations or sweeps of the light beam projectors 37 and 38 in one direction through an angle of about 240° of cam rotation, and through the remaining angle of about 120° of cam rotation to the starting position. The sweep angle is selected to cause the longitudinally directed light beams from projectors 38 to scan the position of the passive reflective means so the reflected light beam path returned from the thrust line units 25 and 26 will activate photosensors 38A. Potentiometer means 45 rotates with the cam 41 and generates signals which are the analogs of the angle of the returning light beam directed from the passive reflector means and the angle of the transverse light beam upon reaching the opposite photosensors 37A. The speed of rotation in the sweep angle of 240° of cam rotation will be about one-half the return speed through the sweep angle of 120°. The sensor unit 19 is mounted in operative position on the arm 20, and the circuits from the potentiometer means 45, and for the common source of light 39 pass through arm 20 and emerge in lead 29. The make-up of sensor unit 22 is the same, and the circuits are embodied in lead 28. The construction of the respective sensor units 19 and 22 is best set forth in pending application of David A. Senften, Ser. No. 798,780, filed May 20, 1977, now U.S. Pat. No. 4,126,943 issued Nov. 28, 1978.

Figures 4, 5, 6:
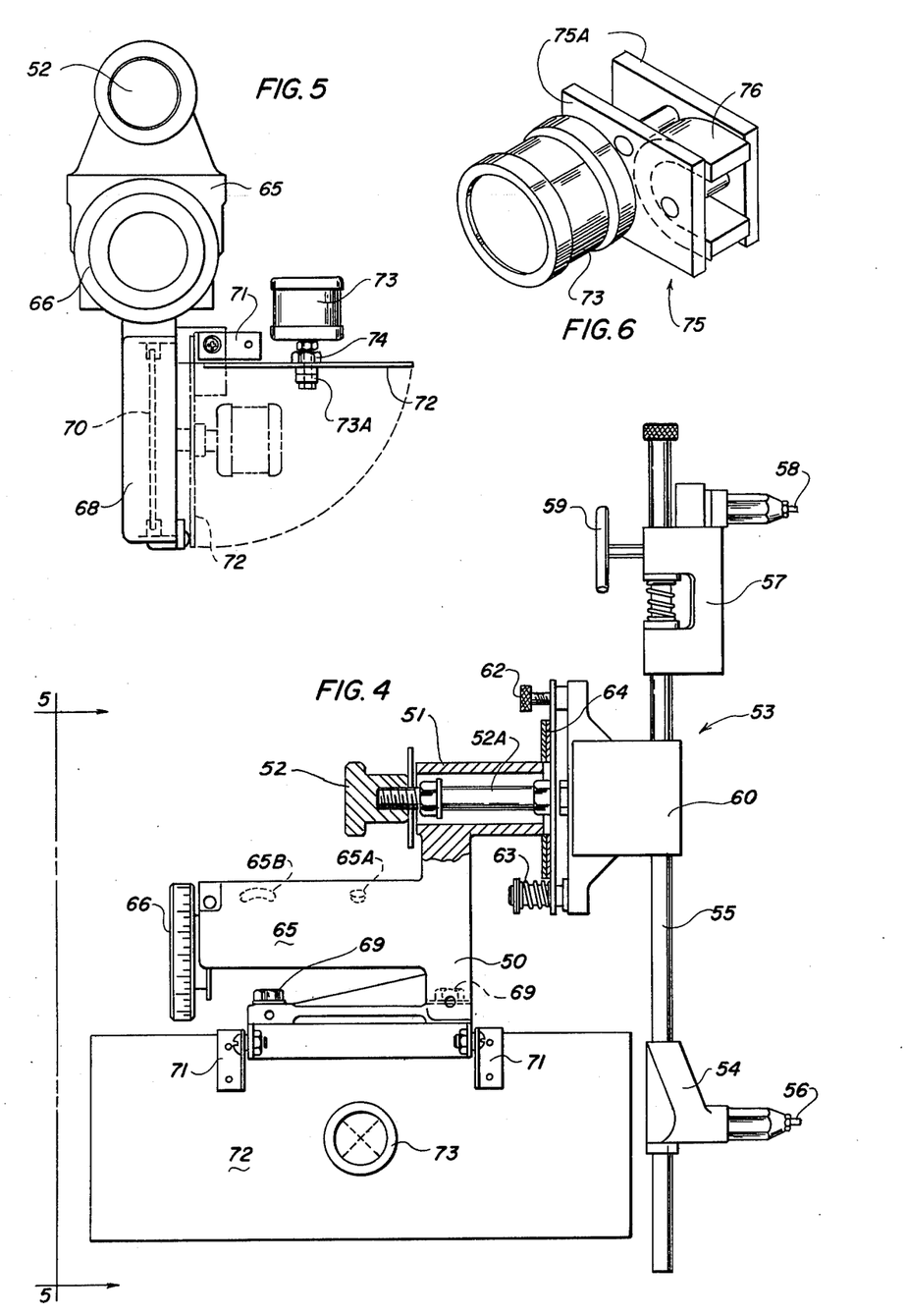
FIG. 4 is an elevational view of a typical thrust line unit carried on a non-steerable wheel, the view been taken along line 4—4 in FIG. 1 with portions shown in section.
FIG. 5 is a view of the typical thrust line unit of FIG. 4 as seen along line 5—5 with the retro-reflector and its support moved into position to uncover a reflector mirror.
FIG. 6 is a perspective view of the retro-reflector removed from the thrust line unit and attached to a magnetic support for mounting on the vehicle body.

In FIGS. 4 and 5 there is seen a thrust line unit which is typical of the units 25 and 26, the one being shown is mounted on the right rear non-steerable wheel. This unit has a frame 50 providing a housing 51 for supporting the clamping means 52 which holds the assembly in pendent position from the wheel mounting adapter 53 of a type seen in Lee Hunter pending application, Ser. No. 881,722 filed Feb. 27, 1978, now U.S. Pat. No. 4,167,819 dated Sept. 18, 1979. The adapter comprises a lower bracket 54 carried on a pair of rods (one being shown) 55 so its wheel rim contact pin 56 is projected toward the wheel rim. The rods 55 also carry a slidable and adjustable bracket 57 opposite the bracket 54 in position to present a wheel rim contact pin 58 which cooperates with the first mentioned pin 56. The bracket 57 is displaced and locked on rods 55 by manipulating the key 59 to drive the pins 56 and 58 into the wheel rim. A centrally disposed bracket 60 is slidable along the rods 55 so the axis of the draw rod 52A may be brought into close alignment with the axis of rotation of the wheel. A plurality of run-out compensating elements (one of three being shown) 62 and cooperating spring guides 63 are provided on a disc 64 to function in connection with adjusting the axis of the draw rod 52A so it is parallel to the axis of wheel rotation. This run-out compensation provision makes it possible to place a wheel camber sensing assembly 65 in proper position to determine camber by rotating the dial 66 to center a bubble device 65B. The pendent position of frame 50 is determined by bubble device 65A. This places the mirror in proper vertical position. Also the dial 66 will show the amount of positive, negative, or zero camber present in the wheel.

The unit is equipped with a depending frame 68 held by threaded means 69 so a flat mirror 70 carried in the frame can be positioned to be substantially perpendicular to the plane of rotation of the non-steerable wheel on which it is carried. The assembly includes a pair of friction controlled hinges 71 which support a plate 72 movable (FIG. 5) between raised full line position to expose the mirror 70 and lowered broken line position to obscure the mirror. The plate 72 carries at a central location a retro-reflector device 73 which may be dismounted, when necessary, by pulling its stem 73A out of a socket 74 which normally frictionally retains the stem 73A so the retro-reflector will not fall off the plate 72.

However, in certain phases of the operation of the present apparatus it is necessary to dismount the retro-reflector from the units at each rear or non-steerable wheel 17 and 18, and attach them to the adjacent surface of the body 27. The attachment means 75 is seen in FIG. 6 where the plates 75A embrace a horse shoe type or other magnetic element 76 with its polepieces exposed so they can engage the vehicle body metal adjacent the rear wheels. The plates 75 also embrace a socket (not shown) which is the same as the socket 74 on the plate 72 (FIG. 5) so the retro-reflector 73 may be snapped into place in the attachment means 75. In vehicles provided with non-metallic fenders, it is necessary to first apply a clip or suitable attaching means so the means 75 will be held in place. It is understood that the flat mirror 70 at each rear non-steerable wheel 17 and 18 is disposed to be in the line of the light beam projected longitudinally from the respective sensor units 19 and 22. When the plates 72 are in the down position to cover the mirrors the retro-reflective devices are located to be within the central area of the mirrors for reflecting the light beams. The positioning of the retro-reflective devices 75 on the vehicle body must be such that the projected light beam will be picked up and reflected, and when this use of the retro-reflective devices is necessary the plates 72 are in position to cover or obscure the mirrors 70.

While the preferred embodiments of apparatus are those above set forth, it is within the scope of this disclosure to use any suitable form of light energized device which performs the function of photosensors 37A and 38A. Since light from the projectors 37 and 38 is a form of radiant energy, it is contemplated that the devices 37A and 38A can be selected to be compatible with the radiant energy projected by projectors 37 and 38. It is also within the scope of this disclosure to provide any suitable support means for attaching the retro 73 to the vehicle body, even though there has been disclosed a magnetic device as one means of support for the retro-reflectors 73. In attaching the retro-reflectors 73 to the vehicle body 27 care must be exercised to have these devices at substantially the same distance out from the body adjacent the rear wheels to achieve close symmetry of location to the body center line, axis, just as the units 25 and 26 achieve substantially the same character of symmetry.

When the outside electrical power is turned on at the console 30 current is supplied through suitable connections (not necessary to show) to the motors 40 at each sensor unit 19 and 22 so the cams 41 oscillate the projectors 37 and 38, and the light source 39 common to both projectors is energized. The transverse light beams from projectors 37 (the sensors 19 and 22 are made in right hand and left hand parts) will begin sweeping through angles which scan the positions of the opposite light energized photosensor devices 37A and signals will be generated which are the analog of the angle of the steerable wheel planes of rotation relative to the transverse light beam relative to the axle common to these wheels. Simultaneously the projectors 38 will throw longitudinally directed beams of light toward the rear or non-steerable wheels 17 and 18 seeking the selected one of the passive reflective mirrors 70 or the passive retro-reflective devices 73. The returning light beams will strike the light energized devices 38A and produce signals which are informative of the relation of the wheels to certain characteristics of the vehicle, as follows:

When the retro-reflectors 73 are in position on the wheels to be in the longitudinally directed light beam scan the signals from devices 38A are analogs of the left and right front wheel toe with respect to the wheel center line. If the retro-reflectors 73 are positioned on the vehicle body 27 adjacent the rear wheels in the longitudinally directed light beam scan the signals from the devices 38A are analogs of the left and right front wheel toe with respect to the vehicle body center line. However, when the flat mirrors 70 are in the path of the longitudinally directed light beam scan the signals from devices 38A are analogs of the left and right front wheel toe with respect to the thrust line developed by the rear wheels. Out of these several relationships, it is a unique aspect of this invention to be able to combine sensor signals to measure and display specific alignment parameters using a common geometric reference (see FIG. 9), such as the vehicle body center line which will be identified as BCL. In certain cases the common reference will be the wheel center line identified as WCL. Front wheel set back is the angle B formed between the perpendicular to the body center line BCL and the average axes connecting the front wheels 15 and 16. If the body center line BCL and the wheel center line WCL do not coincide, the angular deviation is identified as C. The presence of a different tread width angle is identified as A, whereas a difference in body width to tread width angle is identified as D. Another important parameter is the angle $\theta$ (Theta) formed between either front wheel sensor mount and the path of the reflected light beam from the rear wheel (at the same side) relative to the vehicle body center line BCL.

From the foregoing identified parameters the following relationships will result:

Signal L=LFT (left front toe relative to BCL)+B
Signal L'=LFT+$\theta$

However, the values of L' will vary depending on the passive reflector being used, such as:

Signal L'm designates the use of the mirror 70
Signal L'r designates use of the retro 73 on the wheel
Signal L'b designates use of the retro 73 on body 27.

Figure 9:
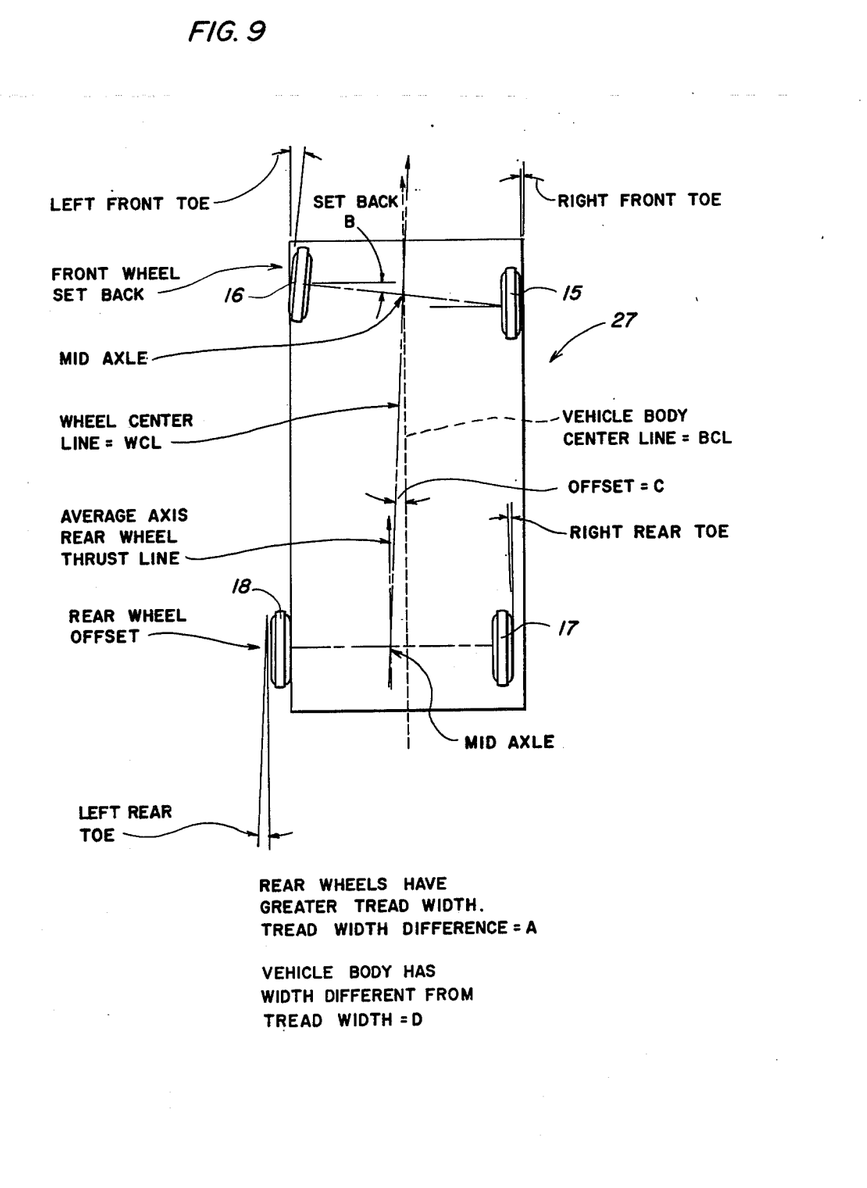
FIG. 9 is a diagrammatic plan view showing a vehicle body and wheel arrangement representative of an alignment condition which the present invention is capable of diagnosing.

Also, the value of $\theta$ will vary depending on the passive reflector being used, such as:

For signal L'm $\theta$ is equal to LRT (left rear toe)
For signal L'r $\theta$ is equal to A+C
For signal L'b $\theta$ is equal to D Thus the longitudinal sensor signals from the left front wheel sensor device 38A are voltages analogous to the geometry shown in FIG. 9, as follows:

Signal L'm=LFT−LRT (left rear toe)
Signal L'r=LFT−A+C
Signal L'b=LFT−D

Similarly, sensor signals from the right front wheel sensor device 38A are voltages analogous to the geometry shown in FIG. 9, as follows:

Signal R=RFT (right front toe)−B
Signal R'm=RFT−RRT (right rear toe)
Signal R'r=RFT−A−C
Signal R'b=RFT−D

ELECTRONIC APPARATUS

Figure 7:
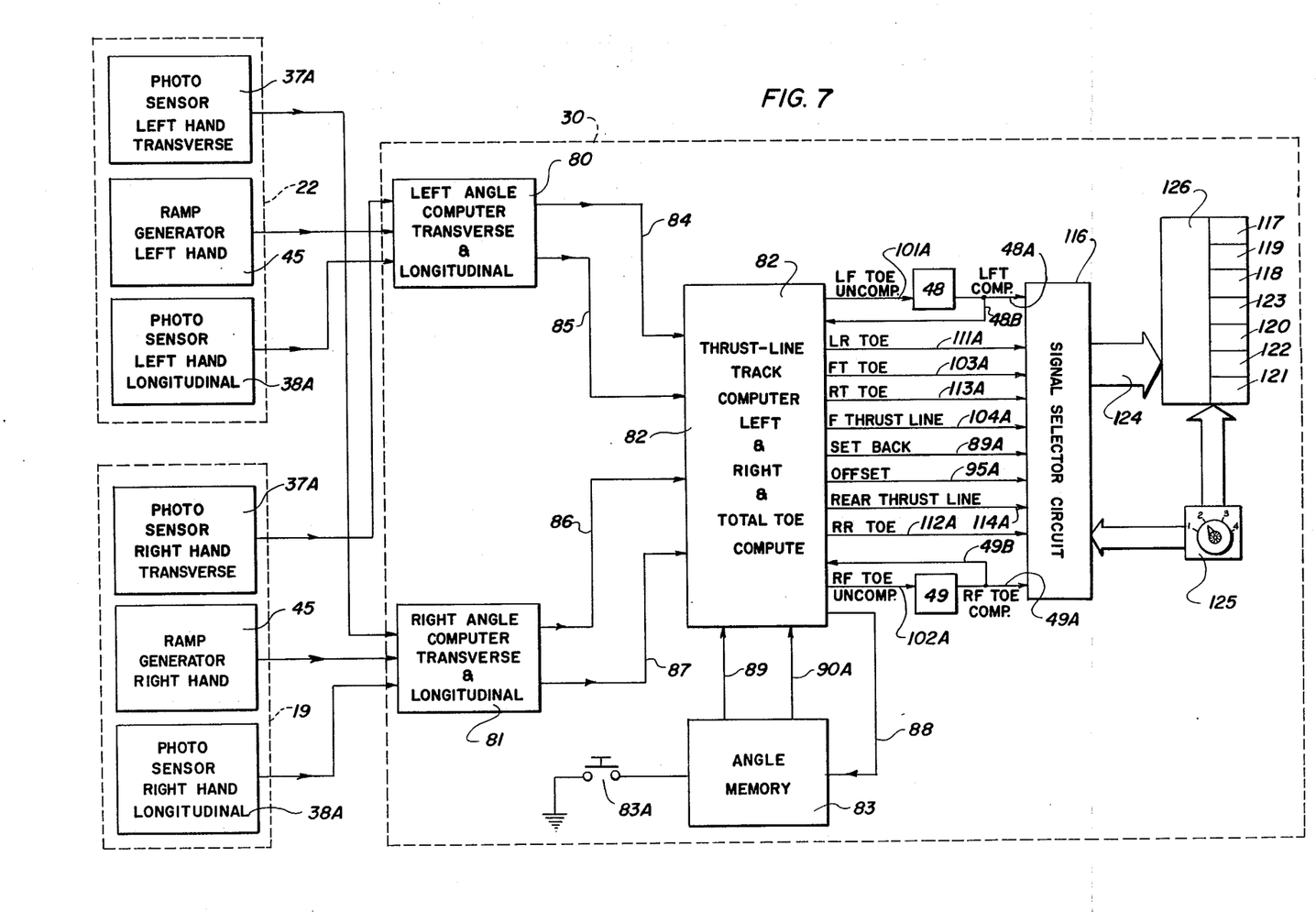
FIG. 7 is a block diagram of the circuit arrangement for displaying the various alignment characteristics developed in and by the present embodiment.

FIG. 7 illustrates the general circuit arrangement housed in the console 30 for translating the functions of the front wheel mounted sensors 19 and 22 and the rear wheel mounted thrust line units 25 and 26 into usable information about the alignment conditions of a vehicle. When armed with such information a number of corrections can be made to accommodate, reduce, or eliminate faults, such as front wheel set back or rear wheel off-set, or possibly to correct divergence of body center line to wheel center line. In FIG. 7, a signal from the left wheel sensor 22 generated by device 37A is related to the angle of the transverse light beam to the plane of wheel rotation, and the same relationship for the opposite or right wheel sensor 19 is embodied in the signal from its device 37A. In like manner, the devices 38A in each of the front wheel sensors 19 and 22 generate signals representing the relation of the longitudinal light beams to the specific passive reflector means 70 or 73 being employed.

The respective signals from the photosensor device 37A for the right front wheel mounted sensor 19 and the signal from the photosensor 38A for the left front wheel mounted sensor 22, together with the ramp voltage generated by the potentiometer means 45 in the sensor 22 are fed into computer 80. The computer 80 develops a signal in lead 84 which represents left front wheel toe relative to body center line, plus a factor B if set-back is present, discovered by information from the longitudinal signals. The computer 80 also develops a signal in lead 85 which represents information about the relationship of front to rear or longitudinal parameters, depending on the passive reflector being used. This signal may be dependent upon use of the mirror 70, or the retro-reflector 73 on either the rear wheel or the vehicle body.

In like manner the respective signals from the photosensor device 37A for the left front wheel mounted sensor 22 and the signal from the photosensor 38A for the right front wheel mounted sensor 19, together with the ramp voltage generated by the potentiometer means 45 in the sensor 19 are fed to computer 81. The computer 81 develops a signal in lead 86 which represents right front wheel toe relative to the body center line, minus a factor B if set-back is present, as discovered by information from the longitudinal signals. Also, the computer 81 develops another signal in lead 87 which represents longitudinal alignment information, depending upon the use of the mirror 70 or the retro-reflector 73 on the wheel or on the body.

The respective signals developed in the computers 80 and 81 are fed into a composite computer 82 and are processed in predetermined ways, depending upon the information received, to develop desired alignment information. In general, computer 82 has an output 101A for left front toe corrected for run-out in compensator 48 and the corrected output 48A is fed into a signal selector circuit 116 from which desired information can be extracted, as well as being fed back to the computer 82 in lead 48B. In like manner the output 102A for right front toe is fed into run-out compensator 49, and the compensated signal is fed by line 49A into signal selector circuit 116 and by line 49B back to the computer 82. Certain signals are stored in a separate memory 83 and are fed through computer 82 to outputs 89A and 95A to the circuit 116. As can be appreciated by comparing FIGS. 7 and 8, front total toe signal 103A, front thrust line signal 104A, left rear toe signal 111A right rear toe signal 113A are each fed into circuit 116. Finally the rear thrust line signal 114A is fed into circuit 116 so that the desired information is made useable for display (FIG. 7) or recording. Generally the signal selector circuit 116 is connected to displays 117, 118, 119, 120 121, 122 and 123 to be described presently, and these are supplied through connection 124. However, the desired type of information to be displayed or stored or recorded is processed in appropriate circuit block 126 controlled through a signal output controller 125 connected into the circuit 116 and the circuits 126.

Figure 8:
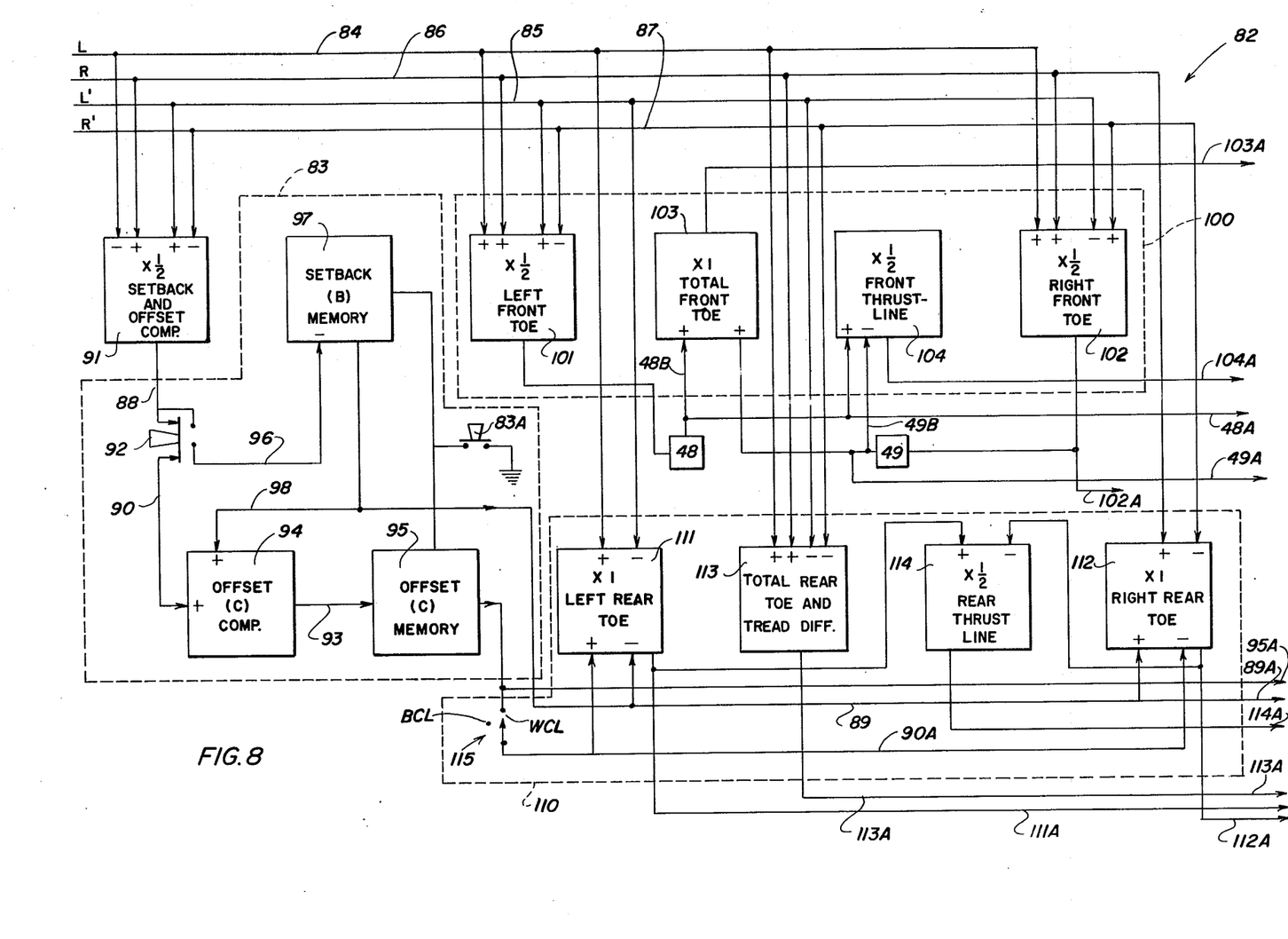
FIG. 8 is a more detailed block diagram of the circuits components embodied in FIG. 7.

The circuits of computer 82 are shown in the block diagram of FIG. 8, and attention will be directed to that diagram. The signals fed into this computer are described in relation to the view of FIG. 7 and comprise left front sensor signal leads 84 and 85, and right front sensor signal leads 86 and 87. These leads correspond to the previously described leads carrying sensor signals generally denominated L, R, L' and R' respectively. It is of course understood now that the characteristics of the source of signals in leads 85 and 87 depend upon the selection and location of the passive reflector means 70 and 73. In a general way the diagram of FIG. 8 comprises a circuit 91 within the computer 82 for set-back and off-set computation in which signals from leads 84, 85, 86 and 87 are summed in relation to the positive and negative polarity indicated, and multiplied by one-half. The results of the computation in circuit 91 is fed into memory 83 by lead 88. The lead 88 is connected to a two position switch 92 which enters set-back information within the memory circuit 83. The switch 92 is normally in a circuit make position through connection 90 into a sub-circuit 94 for computing the off-set information and inserting it in the memory sub-circuit 95. When switch 92 is moved to its second position a lead 96 feeds information into a set back memory sub-circuit 97. When the memory sub-circuits 95 and 97 are to be cleared normally open switch 83A is closed.

The circuits in computer 91 control the character of information to be stored in the memory circuits 83, since the utilization of memory in the case of off-set and set-back parameters is to facilitate subsequent use of such measurements to refine what would be otherwise ambiguous information. The information must be stored in the memory 83 because it is derived in one method of using units 25 and 26, but must later be algebraically mixed when the units 25 and 26 are being used in different modes. For example, the information in lead 88 is set-back when the signals in leads 85 and 87 are developed from the retro-reflectors 73 on the vehicle body 27. Switch 92 is manipulated to feed that information into the set-back memory 97. When the signals in leads 85 and 87 are derived from retro-reflectors on the wheels 17 and 18 then the information in lead 88 is off-set minus set-back. Since the input signal to the off-set computer 94 is signals C less B, the addition of the output from the set-back memory 97 causes the off-set computer to develop only off-set information for subsequent use on other computations as well as for display of the geometric conditions of the vehicle.

More specifically, computer 91 performs in the following manner, using signals from leads 84, 85, 86 and 87, and the computation is as follows for set-back and for off-set. The general computation is based on the signal in lead 88 being expressed by the formula $\frac{1}{2}(L'-L-R'+R)$. From the parameters previously established with the retro-reflectors 73 on the vehicle body 27 it follows that $$\text{Signal 88} = \frac{1}{2}(L_b' - L - R_b' + R) \quad \text{Eq. 1:}$$
$$= \frac{1}{2}[(LFT - D) - (LFT + B) - (RFT - D) + (RFT - B)]$$
$$= \frac{1}{2}(-2B) = -B \text{ (where } B \text{ is set-back)}$$

Thus the value of set-back from equation 1 is entered into the set-back memory circuit 97 by pressing switch 92 to connect leads 88 and 96.

Using the general computation formula, but now substituting for the retros 73 mounted on the devices 25 and 26, it follows that $$\text{Signal 88} = \frac{1}{2}(L_r' - L - R_r' + R) \quad \text{Eq. 2:}$$
$$= \frac{1}{2}[(LFT - A + C) - (LFT + B) - (RFT - A - C) - (RFT - B)]$$
$$= \frac{1}{2}(2C - 2B) = C - B \text{ (off-set less set-back)}$$

The signal of off-set less set-back is normally connected through switch 92 to the off-set computer 94 by lead 90. The set-back previously stored in memory 97 alone is fed by lead 98 to the computer 94 and summed with off-set less set-back to produce off-set alone in memory 95.

It is desired to perform the set-back and off-set steps early in the diagnosis procedure for use in following steps when the reflective mirrors 70 are used. Thus, in addition to obtaining off-set and set-back as useful alignment knowledge, these are required to properly compute individual rear wheel toe angles and rear wheel thrust line.

Circuit system of FIG. 8 includes circuits in block 100 for examining front wheel toe and front thrust line or direction. Circuit 100 includes a left toe sub-circuit amplifier 101, right toe sub-circuit amplifier 102, total front toe sub-circuit amplifier 103, and front thrust line sub-circuit amplifier 104. The informative signals from leads 84, 85, 86 and 87 are connected to the sub-circuit amplifiers 101 and 102 in the indicated polarity and scaled with the indicated multiplier. The results are that sub-circuit amplifier 101 generates left front wheel toe and sub-circuit amplifier 102 generates right front wheel toe. The results generated in sub-circuit 101 are connected through compensation circuit 48 and shown at the left toe display 117. The results generated in sub-circuit 102 are connected through a compensation circuit 49 and shown at the right display 118. When these results are added in sub-circuit 103 the total front wheel toe is generated and shown at display 119. In the circuit 100 when the retro-reflectors 73 are on the wheel mounted units 25 and 26, the signals in leads 85 and 87 are related to the wheel center line WCL, but when the retro-reflectors 73 are placed on the vehicle body 27 (by means seen in FIG. 6) the signals in leads 85 and 87 are related to the body center line (BCL). Circuit 100 also includes a sub-circuit amplifier 104 which is connected to the leads 48B and 49B to generate information about the front wheel thrust line in relation to the source of the information derived from the passive reflector means 70 and 73 and which ones thereof are selected at which positions. When selected by the controller 125, the front thrust line information is put into the circuit 116 and may be shown at display 123.

Still referring to FIG. 8, the circuit system 82 includes circuits in block 110 for examining rear wheel toe, thrust line and tread width difference. The sub-circuit amplifier 111 develops left rear wheel toe through signals from leads 84 and 85 in the indicated polarity and scaled with the indicated multiplier. This information is modified or refined by signals from memory 83 by leads 89 and 90A, said signals being scaled in the indicated polarity.

More specifically circuit 111 receives signal L from lead 84, signal $L'_m$ from lead 85, and set-back B from lead 89, as follows:

$$\text{Circuit 111} = L - L_m' - B$$

-continued
$$= LFT + B - (LFT - LRT) - B$$
$$= LRT \text{ (relative to } BCL\text{)}$$
Similarly:
$$\text{Circuit } 112 = R - R_m' + B$$
$$= RFT - B - (RFT - RRT) + B$$
$$= RRT \text{ (relative to } BCL\text{)}$$

When switch 115 is operated to the position WCL the result is that off-set is applied to add to the left rear toe and to subtract from the right rear toe. This step rotates these measurements to be with respect to wheel center line (WCL) rather than to body center line (BCL).

It can now be appreciated from the foregoing that when the retro-reflectors 73 are on the vehicle body, rear wheel toe is related to the body center line BCL. However, when the retro-reflectors 73 are on the wheels 17 and 18 the wheel toe is related to the wheel center line WCL. Thus the rear wheel toe values are corrected by the off-set influences through manipulation of selector switch 115 for introducing the off-set refinement from the off-set circuit 95 in the memory 83. The introduction of these factors is handled with the indicated polarity. In the case of the right rear wheel toe computation in sub-circuit amplifier 112, the signals from the leads 86 and 87 are introduced with the indicated polarity and the multiplier factor, subject to refinement of off-set signals from circuit 95 in memory 83 and in the indicated polarity through leads 89 and 90A.

Still referring to the circuit 110, the total rear wheel toe is computed in sub-circuit amplifier 113 through the complement of signals when using mirrors 70 from leads 84, 85, 86 and 87 scaled by the indicated polarity and multiplied by the indicated factor. Tread width differences between the rear wheels and front wheels is also computed in this same sub-circuit 113, this factor being dependent upon the retro-reflectors being on the rear wheel units 25 and 26. The tread width can be displayed through lead 113A connected to circuit 116 and called out by selector 125 at display 123. In order to find the rear thrust line, the signals from the left rear toe amplifier 111 and right rear toe amplifier are fed into a sub-circuit 114 along with signals from memory 83, all of which are processed through the indicated polarity and multiplied by the indicated factor of one-half. This result is picked up in circuit 116 through lead 114A and may be shown on display 123 when so selected.

Set-back and off-set information stored in memory 83 may be displayed in the following manner. It is understood that the amplifier 91 processes the signals from leads 84, 85, 86 and 87 in the indicated polarity and with the indicated scale. The switch 92 is normally closed making a circuit to the off-set computer 94, but when actuated the circuit is made through lead 96 to the set-back amplifier 97. When the retro-reflectors 73 are placed on the vehicle body, as previously described in connection with FIG. 6, amplifier 97 produces signals analogous to set-back only. Amplifier 97 provides a signal in line 89 which can be passed through circuit 116 to the display 123 by moving the selector 125 to position 3 (FIG. 1). The set-back amplifier provides an input to the off-set computer amplifier 94 through line 98 so that the amplifier 94 can develop an output of off-set only in line 93 which supplies this information to off-set memory amplifier 95. The off-set information can be selected for display 123 by selecting position 4 at selector 125.

In view of the above it should be clear that rear wheel alignment information developed in circuits 111, 112 and 113 pass through leads 111A, 112A and 113A to the circuit 116 (FIG. 7) and may be presented on displays 120, 121 and 122 which relate respectively to left rear toe, right rear toe and total rear toe, by moving selector 125 to position 2.

SUMMARY

It should now be appreciated from the foregoing description that the present vehicle wheel and body alignment diagnosing system embodies novel features for finding a number of vehicle wheel and wheel to body alignment characteristics not heretofore possible in the operation of current alignment equipment. In its broadest aspects the invention embodies a method which includes mounting light beam projecting means on each of a first set of wheels in position so that the projected light beams are directed simultaneously in directions substantially normal and parallel to the planes of rotation of the first set of wheels, disposing first light beam reflecting means on each of a second set of wheels so as to be in position in which the reflective surface is substantially normal to the plane of rotation of the second set of wheels, providing second light beam reflecting means capable of being carried selectively of each of the second set of wheels and by the vehicle body adjacent those wheels, disposing light beam sensor means in paths to intercept the reflected light beams and to be thereby energized for generating signals representative of the desired alignment characteristics, and processing the generated signals to compute and separate out the respective alignment characteristics of the first and second sets of wheels, whereby such characteristic as set-back, off-set, wheel toe and wheel thrust line relationships can be made known.

While there has been shown in the drawings and described a preferred embodiment for the practice of this invention, it is to be understood that unnecessary limitations are not to be imposed on that apparatus for diagnosing vehicle wheel and body alignment relationships. In its broad aspects the invention resides in utilizing, with active sensor means mounted on a certain set of wheels, cooperative passive sensor means which have a definite relationship with the vehicle body on another set of wheels, whereby the alignment characteristics of the respective sets of wheels may be discovered and used to check the overall alignment, or used to monitor the wheel positions during alignment correction. While the foregoing description has been given with the sensors 19 and 22 located on the front or steerable wheels of the vehicle, it is to be understood that these sensors can be placed on the non-steerable wheels 17 and 18, while the passive reflector units 25 and 26 may be located on the front steerable wheels 15 and 16. It is not required that the sensors 19 and 22 and the passive means 25 and 26 need to be interchanged end for end of the vehicle. In using the present items of apparatus all essential alignment characteristics may be discovered without such interchange.

What is claimed is:

1. Apparatus for use in finding the alignment characteristics of first and second sets of vehicle wheels relative to each other and with respect to the vehicle body, said apparatus comprising: alignment scanning means carried by each wheel of a first set for projecting a beam of radiant energy transversely and longitudinally of the vehicle body; radiant energy reflecting means selectively carried by each of a second set of wheels and the adjacent vehicle body in position for reflecting the radiant energy beams projected longitudinally from said scanning means; first signal generating means carried by each of said scanning means positioned to be energized by the transversely projected radiant energy beam; second signal generating means carried by each of said scanning means positioned to be energized by the longitudinally projected radiant energy beam; and signal receiving and computing means connected to said first and second signal generating means carried by each of said scanning means for calculating wheel and body alignment characteristics.

2. The apparatus set forth in claim 1 wherein, said signal receiving and computing means includes individual circuits for calculating alignment characteristics for said first set of wheels.

3. The apparatus set forth in claim 1 wherein, said signal receiving and computing means includes circuits for calculating alignment characteristics for said second set of wheels.

4. The apparatus set forth in claim 1 wherein, said signal receiving and calculating means includes a memory circuit for storing wheel off-set and set-back alignment information.

5. The apparatus set forth in claim 1 wherein, said signal receiving and computing means includes a calculating circuit for set-back and off-set alignment characteristics in said first and second set of wheels, a first sub-circuit connected to said calculating circuit for memorizing off-set alignment, a second sub-circuit for memorizing set-back alignment connected to said first sub-circuit, and a switch operable to connect said second sub-circuit with said calculating circuit.

6. The apparatus set forth in claim 1 wherein, said signal receiving and calculating means includes a circuit block for finding wheel toe and thrust line of said first set of wheels.

7. The apparatus set forth in claim 1 wherein, said signal receiving and calculating means includes a circuit block for finding wheel toe, thrust line and tread width difference of said second set of wheels.

8. The apparatus set forth in claim 1 wherein, said signal providing and calculating means includes a first circuit block for finding alignment characteristics of said first set of wheels, a second circuit block for finding alignment characteristics of said second set of wheels, other circuit means selectively connected into said second circuit block and to said first and second signal generating means for discriminating between signals from said signal generating means with said radiant energy reflecting means selectively on said second set of wheels and on the adjacent vehicle body.

9. The apparatus set forth in claim 1 and including display means, and selector means connected to said display means and to said signal receiving and calculating means for selecting signals representing wheel alignment characteristics related to the selected positions of said radiant energy reflective means.

10. Apparatus for use in finding alignment characteristics of first and second sets of wheels on a vehicle body and the relationship of the wheel alignment to each other and to the vehicle body, said first and second set of wheels being generally in following relationship, said apparatus comprising: radiant energy projecting means carried by each wheel of said first set thereof in position to direct the radiant energy transversely of said first set of wheels for scanning transversely of said vehicle in relation to the relative alignment characteristics of said first set of wheels; said radiant energy projecting means carried by each wheel of said first set being in position also to project radiant energy toward said second set of wheels for scanning longitudinally of said vehicle in relation to the position of said second set of wheels; radiant energy sensing means adjacent said radiant energy projecting means in positions to respond to transversely and longitudinally projected radiant energy; radiant energy reflective means adaptable for carriage selectively by said second set of wheels and by said vehicle body adjacent said second set of wheels, said reflective means being in position for reflecting the longitudinally projected radiant energy such that it cooperates with said radiant energy sensing means in finding alignment characteristics of said first set of wheels relative to said second set of wheels and alignment characteristics of said second set of wheels relative to the vehicle body; signal generating means carried by each of said first set of wheels in position to be responsive to said radiant energy sensing means for generating first signals resulting from scanning the transversely projected radiant energy and for generating second signals resulting from scanning the longitudinally projected and reflected radiant energy; signal computation circuit means connected to said signal generating means and operable to discriminate between said first and second signals for calculating wheel and body alignment characteristics from said signals; and means connected to said computation circuit means and selectively operable for displaying the results of the computation.

11. Apparatus for finding alignment characteristics of spaced pairs of vehicle wheels disposed on opposite sides of a wheel center line and the alignment thereof relative to the center line of the vehicle body, said apparatus comprising: first alignment sensors carried in predetermined relations on each of a first pair of the vehicle wheels; radiant energy projecting means for each of said first sensors projecting radiant energy beams both transversely of the wheel center line and longitudinally toward the wheels of the second pair of vehicle wheels; first radiant energy reflecting means in predetermined relations on each of the second pair of vehicle wheels; second radiant energy reflecting means selectively carried on each of the second pair of vehicle wheels and by the vehicle body adjacent said second pair of vehicle wheels; first signal generating means carried by said first sensors in position to be energized by radiant energy projected transversely of the wheel center line; second signal generating means carried by said first sensors in position to be energized by radiant energy reflected from said first and second reflecting means and projected longitudinally toward said second pair of vehicle wheels; and computer means connected to said first and second signal generating means and selectively operable with said second radiant energy reflecting means for finding toe alignment of said first pair of wheels with respect to body center line, and with said first radiant energy reflecting means for finding toe alignment of said first pair of wheels with respect to the thrust line of said second pair of wheels.

12. A method for finding vehicle wheel and wheel to body alignment characteristics comprising: mounting radiant energy beam projecting means on each of a first set of wheels in position so that projected radiant energy beams are directed simultaneously substantially normal and parallel to the plane of wheel rotation; disposing first radiant energy beam reflecting means on each of a second set of wheels in position to have a reflective surface substantially normal to the plane of wheel rotation, providing second radiant energy beam reflective means for carriage selectively by each of said second set of wheel and by the vehicle body adjacent said second set of wheels; locating radiant energy beam sensor means in the paths of the reflected beams to intercept and be energized by the simultaneously projected beams for generating signals representative of wheel and wheel to body alignment; and processing said generated signals to compute the respective alignment characteristics of said first and second sets of wheels in terms of set-back, off-set, toe and thrust line relationships.

13. The method of claim 12 wherein, processing said generated signals includes the steps of computing for wheel set-back.

14. The method of claim 12 wherein, processing said generated signals includes the steps of computing for wheel off-set.

15. The method of claim 12 wherein, processing said generated signals includes the steps of computing for toe of one of said sets of wheels with respect to wheel center line.

16. The method of claim 12 wherein, processing said generated signals includes the steps of computing for toe of one of said sets of wheels with respect to body center line.

17. The method of claim 12 wherein, processing said generated signals includes the steps of storing the computed wheel off-set and set-back alignment characteristics.

18. The method of claim 12 wherein, processing said generated signals includes the steps of computing for thrust line alignment of said sets of wheels.

19. A method for finding vehicle wheel alignment characteristics comprising: locating radiant energy projecting means in predetermined positions on a first set of wheels and projecting radiant energy beams transversely between the first set of wheels and longitudinally from the first set of wheels toward a longitudinally spaced second set of wheels; sensing at each wheel of the first set the radiant energy beams projected transversely therebetween; locating first reflective means in predetermined positions on the second set of wheels and second reflective means selectively over said first reflective means and on the vehicle adjacent said second set of wheels for intercepting the longitudinally projected radiant energy beams; sweeping the transversely and longitudinally projected radiant energy beams for scanning the sensing means at each wheel of the first set and for scanning the location of the first and second reflective means; reflecting back selectively toward the first set of wheels the intercepted longitudinally projected radiant energy beams reaching the location of the first and second reflective means; using the sensed transversely projected radiant energy beams to generate signals representative of first alignment characteristics of the first set of wheels; using the longitudinally projected radiant energy beams when reflected back from the area adjacent the second set of wheels to generate signals representative of the alignment characteristics of the first and second set of wheels; and combining the respective signals generated as a result of the radiant energy beam directioning in an alignment calculating computer for revealing the alignment characteristics.

20. A method of finding vehicle wheel and body alignment characteristics comprising: disposing radiant energy beam projecting means on each of a first set of wheels for directing a first beam transversely of the vehicle and for directing a second beam longitudinally of the vehicle in relation to the plane of wheel rotation; disposing radiant energy beam reflecting means selectively on the wheels of a second set spaced from the first set of wheels and on the vehicle body adjacent the second set of wheels; disposing radiant energy beam sensing means adjacent the radiant energy beam projecting means in positions to receive the radiant energy beams projected both transversely and longitudinally and convert the same into electrical signals representative of wheel to wheel and wheel to body alignment; gathering the electrical signals in a signal processing multicircuit computer for determining the alignment characteristics between the first and second sets of wheels and the relative alignment relationship of the vehicle body to the sets of wheels; and displaying the results of the computer determination.

* * * * *